Inventor
Theodore Rau

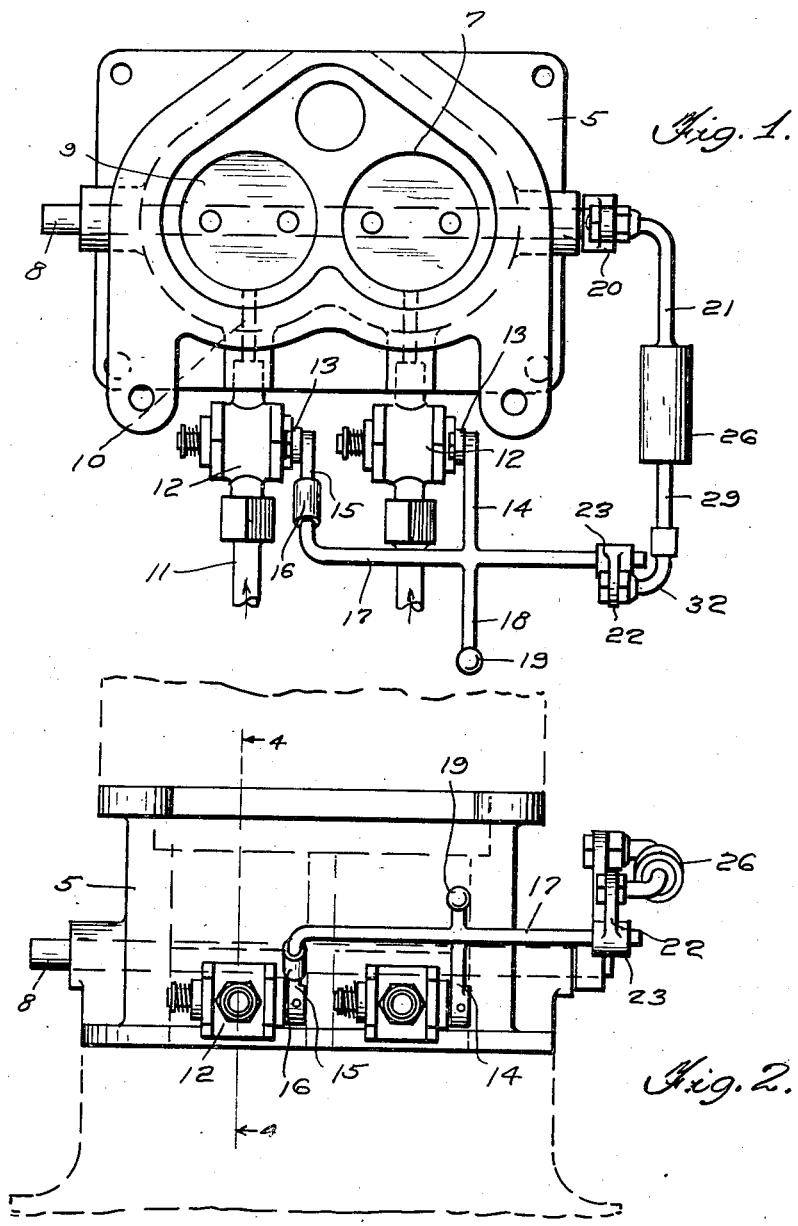

March 7, 1944.　　　　T. RAU　　　　2,343,580
FUEL FEEDING CONTROL ATTACHMENT FOR INTERNAL COMBUSTION ENGINES
Filed April 18, 1942　　　3 Sheets-Sheet 3

Inventor
Theodore Rau

By Clarence A. O'Brien
and Harvey B. Jackson
Attorneys

Patented Mar. 7, 1944

2,343,580

UNITED STATES PATENT OFFICE 2,343,580

FUEL FEEDING CONTROL ATTACHMENT FOR INTERNAL COMBUSTION ENGINES

Theodore Rau, Philadelphia, Pa.

Application April 18, 1942, Serial No. 439,580

2 Claims. (Cl. 123—103)

The present invention relates to new and useful improvements in internal combustion engines and has for its primary object to provide means for controlling the feeding of fuel to the intake manifold of the engine and mixing the same with air to provide the desired combustible mixture.

An important object of the present invention is to provide valve control means for admitting fuel in gaseous form to the intake manifold and also valve control means for admitting air to the manifold for mixing with the fuel and connecting said valves for synchronous operation from a single throttle.

A further object of the present invention is to provide a control device of this character adapted for use with dual intake manifolds leading to the engine, or to individual engines.

A still further object is to provide an apparatus of this character of simple and practical construction, which is efficient and reliable in performance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1 is a top plan view of a dual air control fitting adapted for mounting in the intake manifold of an engine.

Figure 2 is a front elevational view thereof.

Figure 3:
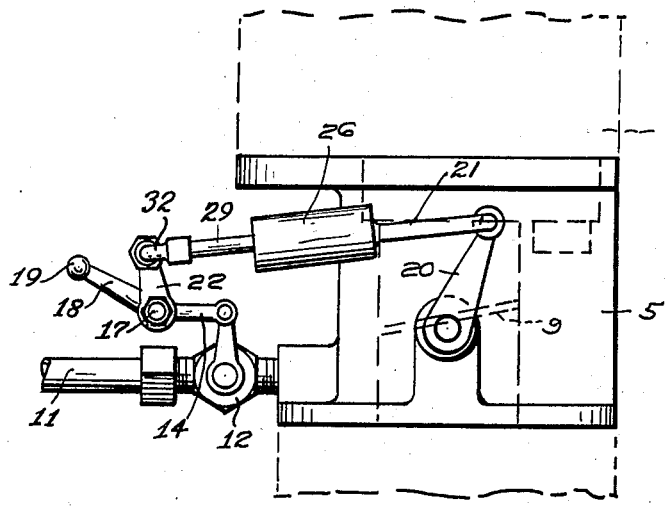
Figure 3 is a side elevational view.
Figure 4:
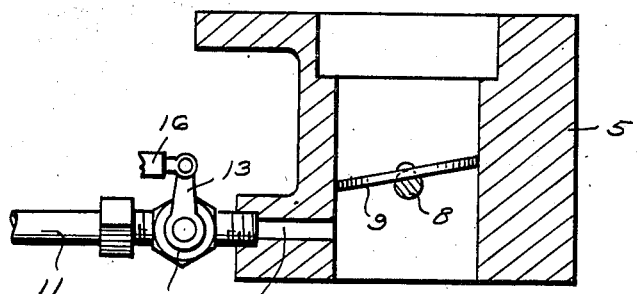
Figure 4 is a sectional view taken substantially on a line 4—4 of Figure 2.

Referring now to the drawings in detail, and with particular reference to Figures 1 to 5, inclusive, the numeral 5 designates the body of a fitting adapted for mounting in an intake manifold of an engine represented by the dotted lines 6 in Figures 2 and 3. The fitting may be provided with a pair of passages 7 for admitting air to a dual type of engine, or the fitting may be formed with a single air passage, if desired.

A shaft 8 extends transversely of the passages 7 to which is secured the butterfly valves 9 operatively mounted in the respective passages for controlling the admission of air to the manifold in the usual manner.

Figure 7:
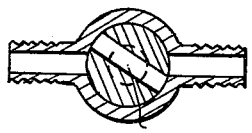
Figure 7 is a transverse sectional view of the fuel control valve.

Lateral passages 10 extend through the body of the fitting for communication with each of the passages 7 and to which fuel feed pipes 11 are connected by means of valves 12, the valves being of a rotary type, as shown in detail in Figure 7 of the drawings, and of conventional construction.

Each of the valves are operated by means of an arm 13, one of the arms having a manipulating rod 14 pivotally attached thereto, and the other of the arms having a sectional rod 15 pivotally attached thereto, the sections of the rod 15 being adjustably connected by means of an internally threaded sleeve 16. The rods 14 and 15 are formed integrally with a cross-rod 17, an extension 18 being formed on the cross-rod 17 at right angles thereto and in the general direction of the arms 14 and 15, as shown to advantage in Figure 1 of the drawings. The end of the extension 18 is formed with a ball 19 to which a manually operated rod may be attached for actuating the rod and the valves 12 by a movement as shown by the arrow in Figure 3 of the drawings.

To the shaft 8 is attached an arm 20 which is rotatively connected to the cross-rod 17 by means of a sectional link 21 and to an arm 22 adjustably secured on the cross-rod 17 by means of a collar 23, the arms 20 and 22 extending in a generally upward direction as shown to advantage in Figure 3 of the drawings.

Figure 5:
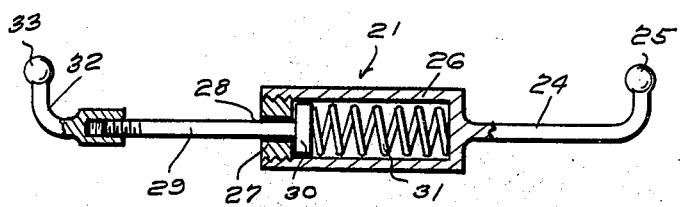
Figure 5 is a longitudinal sectional view of the sectional link connecting the fuel and air control valve.

The sectional link 21 is shown in detail in Figure 5 of the drawings, and includes a section 24 having a ball 25 at one end for swivelly connecting to the outer end of the arm 20, and formed with a cylindrical socket 26 at its upper end, the outer end of the socket 26 being closed by a threaded plug 27 having a bore 28 therein through which the other section 29 of the link is slidably positioned. The inner end of the section 29 is formed with a head or plunger 30 yieldably projected outwardly by means of a coil spring 31 positioned in the socket. To the outer end of the section 29 is threadedly secured an extension 32 having a ball 33 on its outer end for swivelly attaching to the outer end of the arm 22.

The fuel feed pipes 11 are adapted for connection to a suitable fuel tank containing gaseous fuel under pressure and the butterfly valves 9 and rotary valves 12 are connected by the rods 14 and 15 and the link 21 for synchronous opening and closing movement to regulate the admission of fuel and air into the fitting 5 for entrance into the intake manifold of the engine.

The adjustment of the two valves 12 for uniform opening and closing movement is accomplished by means of the threaded sleeve 16.

Proper adjustment between the butterfly valves 9 and the valves 12 is also accomplished by means of the sectional link 21 and the adjustment of the collar 23 on the cross-rod 17.

Figure 6:
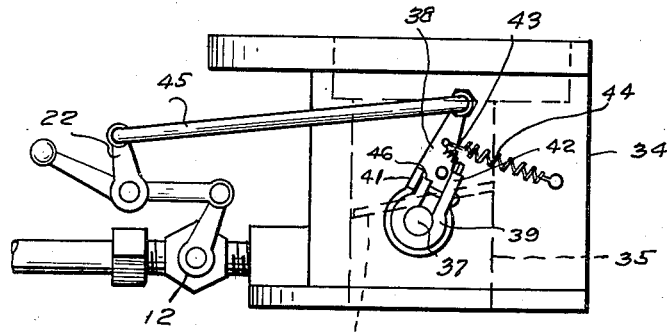
Figure 6 is a side elevational view of a modified operating connection for the butterfly valve.

In the modified form of the invention illustrated in Figure 6 of the drawings, the fitting for mounting in the intake manifold is designated at 34 having the air passage 35 therein controlled by the butterfly valve 36 on the shaft 37. The arm 38 is freely mounted on the shaft and a split clamp 39 is secured on the shaft having one of its split ends 40 engageable with a lug 41 on the arm 38 to close the valve, the other split end of the clamp 42 being connected to the arm 38 by means of a coil spring 43 for moving the butterfly valve into open position upon the actuation of the arm 38. A coil spring 44 is also attached to the arm 38 and to a stationary part of the fitting 34 for closing the valve.

The arm 38 is connected to the arm 22 of the manipulating device by means of a rigid link 45, the fuel control valve and the operating device therefor being constructed in a manner as heretofore explained.

Figure 8:
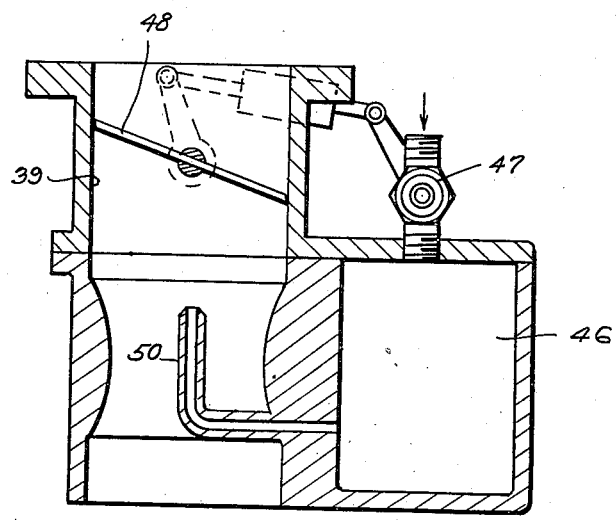
Figure 8 is a vertical sectional view of a modified type of fitting.

In Figure 8 of the drawings I have illustrated the air and fuel control device connected with a conventional form of carburetor which includes a float chamber 46, the float being removed from the chamber in order to adapt the carburetor for use with the present invention. In a carburetor of the type illustrated, the fuel control valve designated at 47 is connected directly to the float chamber 46 and the butterfly valve 48 mounted in the air passage 49 is operatively connected to the valve 47 as heretofore explained. A jet 50 admits the fuel from the chamber 46 into the air passage 49.

It is believed the details of construction, manner of operation and advantages of the device will be readily understood from the foregoing without further detailed explanation.

Having thus described the invention what I claim is:

1. A dual valve operating mechanism comprising a lever extending from each valve in substantially parallel relation to each other, a lateral extension adjustably secured on one lever, and a pivoted link connecting the other lever to said extension for uniform movement of the levers, said other lever embodying yieldable means providing greater movement of said one lever than said other lever.

2. A dual valve operating mechanism comprising a lever extending from each valve in substantially parallel relation to each other, a lateral extension adjustably secured on one lever, a pivoted link connecting the other lever to said extension for uniform movement of the levers, and yieldable means restraining idle movement of said other lever and providing range of movement of said one lever beyond the range of movement of said other lever.

THEODORE RAU.